F. M. CRANE.
SHOCK ABSORBER.
APPLICATION FILED DEC. 26, 1916.

1,287,243.

Patented Dec. 10, 1918.

WITNESS:
Howard P. King

INVENTOR:
Frank M. Crane,
BY
ATTORNEYS.

UNITED STATES PATENT OFFICE.

FRANK M. CRANE, OF MAPLEWOOD, NEW JERSEY.

SHOCK-ABSORBER.

1,287,243.  Specification of Letters Patent.  Patented Dec. 10, 1918.

Application filed December 26, 1916. Serial No. 138,702.

*To all whom it may concern:*

Be it known that I, FRANK M. CRANE, a citizen of the United States of America, and a resident of Maplewood, in the county of Essex and State of New Jersey, have invented new and useful Improvements in Shock-Absorbers, of which the following is a specification.

The objects of this invention are to provide an improved shock absorber adapted for use on automobile wheels and more particularly the front wheels of an automobile which turn in steering the car; to secure a construction which will not necessitate any change in the axle or wheel of an automobile and can be applied by replacing the usual steering knuckles with the parts making up my improved device; to secure a construction by which the distance between the wheel treads in automobiles is not materially changed by applying my improved shock absorber; to secure a construction in which the springs can be easily changed or renewed, whereby the tension or resiliency of the shock absorber can be varied or the device repaired; to receive the shock in the same rearwardly slanting direction in which the wheel receives it; to secure a neat and pleasing appearance; to secure simplicity of construction and operation and to obtain other advantages and results as may be brought out in the following description.

Figure 1:
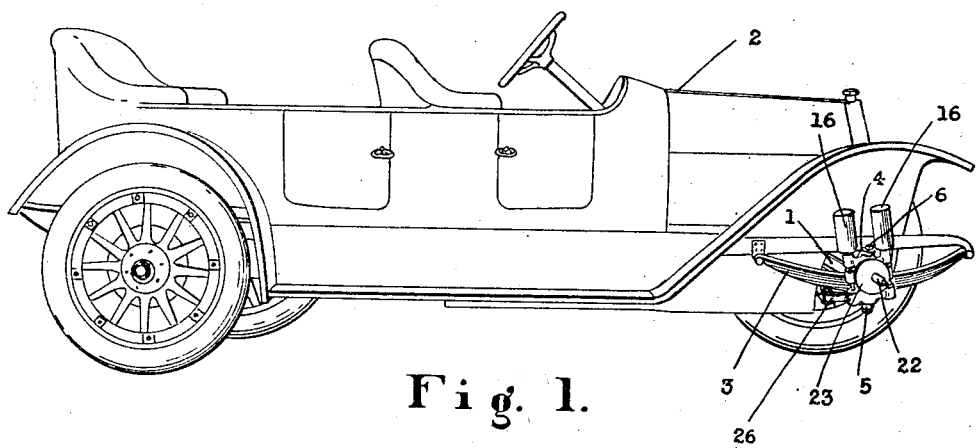
Figures 2, 3:
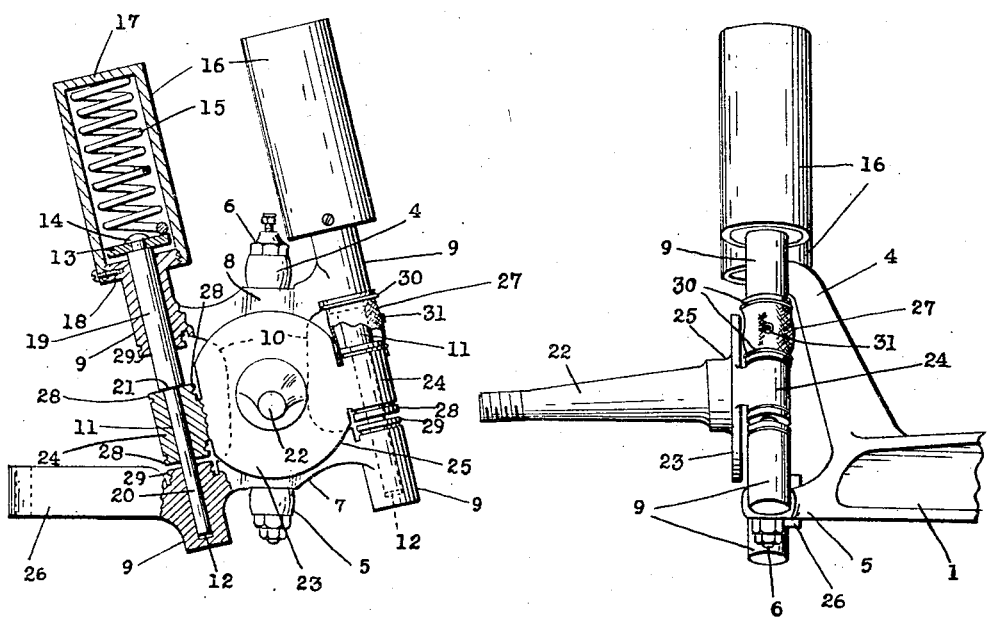

Referring to the accompanying drawings in which like numerals of reference indicate the same parts throughout the several views, Figure 1 is a perspective view of an automobile having my improved shock absorber applied to the front axle thereof and the front wheel next the observer removed;

Fig. 2 is a side elevation of the shock absorber as shown in Fig. 1, partly in section, and Fig. 3 is an elevation of the same looking from the front of the automobile.

In the specific embodiment of the invention illustrated in the drawings, reference numeral 1 indicates the front axle of an automobile or other vehicle 2, which axle is mounted as usual by leaf springs 3. The axle is of any usual and well known construction, having projecting from each of its ends upper and lower arms 4, 5 respectively in substantially the same vertical plane and each pair receiving the usual pivot bolt 6 for the wheel-carrving member.

Hinged upon the pivot bolt 6 is a steering member 7 having a body portion 8 which preferably extends from one arm 4 to the other 5 of the axle so as to prevent any substantial movement of the member longitudinally of the pivot bolt. At opposite edges of the body portion 8 of the steering member, preferably as integral parts therewith, are a plurality of guide sleeves 9 arranged in alined pairs at opposite sides of the pivot bolt, there preferably being four guide sleeves all in the same plane with the pivot bolt. Furthermore, the sleeves of each pair are spaced apart, or in other words, the body of the steering member is cut away or recessed at its middle marginal portions as at 10, 10 with said alined sleeves above and below said cut away portions.

Slidably mounted in each alined pair of sleeves is a plunger rod 11 preferably projecting at its upper end beyond the upper sleeve of the pair but slidable at its lower end in a socket 12 in the lower sleeve which is closed beneath said plunger rod thus protecting it and excluding dust and dirt. At its upper end the plunger rod 11 is provided with a head 13, shown herein as comprising a disk apertured at its center and receiving a reduced portion of the upper end of the rod which is riveted over, as at 14, and holds said disk securely seated on the upper large portion of the rod. A spring 15 bears upon the upper side of said plunger head tending to force both it and the rod downward, and for convenience this spring is inclosed within a cylindrical cap 16 being prevented from upward displacement at its end away from the plunger head by engagement with the closed top 17 of the cap. The cap in turn is held stationary by being screwed onto an enlargement or rim 18 at the upper end of the upper sleeve. It is to be understood, however, that the cap is large enough to permit applying the same over the plunger head and also large enough so the plunger head may move freely up and down within the same. Obviously the cap may be very easily and quickly removed when desired to replace the spring, it being only necessary to jack up the axle and unscrew the cap. In this manner a broken spring may be quickly replaced or a spring having a different tension may be substituted without difficulty when desired.

The upper part 19 of the plunger rod which is within the upper sleeve, as well as a portion depending below said sleeve is preferably of greater diameter than the lower part 20 of the rod which is within and partly above the lower sleeve, thus providing a downwardly facing shoulder 21 intermediate the ends of the rod a distance below the upper sleeve.

The front wheel of the vehicle is mounted as usual on a suitable spindle 22 which slopes slightly downwardly outward, as shown, so the wheel will cant slightly from the vertical as is customary. This spindle 22 as shown terminates at its inner end, or end toward the vehicle, in a plate 23 having diametrically opposite ears 24 projecting radially outward with respect to the plate as well as in an axial direction on the opposite side of the plate from the spindle, said parts constituting a spindle member 25. The ears are furthermore recessed or drilled parallel to each other in a tangential direction with respect to the plate, said recesses being of a size and at such distances apart as to receive the smaller lower parts 20 of the plunger rods. As assembled, the ears 24 of the spindle member project into the cut away portions 10 of the steering member substantially in alinement with the sleeves, and the plunger rods extend from the sleeves through the ears, holding the said members non-rotatably together. The height of the ears is less than the distance between the sleeves of each pair thus permitting relative sliding movement between the steering and spindle members.

As a feature of the present invention, the sliding movement between the steering and spindle members, is in an inclined direction with respect to the plane upon which the vehicle travels, the inclination being upwardly rearward. As shown in the drawings, the pivot bolt passes through the steering member vertically whereas the plunger rods, although parallel to each other and in the same plane with the pivot bolt, slope with respect thereto. The degree of slope is such that the wheel moves upwardly rearward in the same direction as the line of transmission of the blow from the periphery of the wheel to its hub. Consequently the entire force of the blow is transmitted to the springs 15 without being split into vertical and horizontal components as occurs where the resilient movement is vertical and not inclined.

It may here be noted that the spindle member and steering member swing as a unit upon the pivot bolt, so the shock will be transmitted in a straight line from the rim to the springs even while the front wheels are swung, as in going around a corner. Swinging of the members upon the pivot bolt is obtained by the usual steering devices pulling or pushing a suitable arm 26 shown integral with and projecting laterally from one of the sleeves of the steering member.

Furthermore, as my improved shock absorber is preferably constructed the front wheels of the automobile are no farther apart than without the shock absorber. Also it will be seen the wheels and the axle of the automobile are just as found in the automobile not equipped with my improved shock absorber, the only part which has to be replaced in installing my shock absorber being the steering knuckles which are small and inexpensive.

Preferably means are provided for protecting the rods where exposed between the sleeves and ears against dirt and dust, and for illustrative purposes said means are shown in the drawings as comprising flexible boots 27 loosely surrounding the rods and attached at their ends to the sleeves and ears. In carrying out this feature of my invention, I form necks 28 as part of and at opposite ends of the ears 24 and similar necks 29 on the ends of the sleeves 9 toward the ears, all said necks being preferably axially coincident with the rods. A boot 27 is then secured about the pairs of adjacent or facing necks entirely covering the portions of the rods otherwise exposed between said necks, said boots being held as by wire bands 30 at each end encircling the boot and neck thereat. For more positively securing the boots, it is preferable to groove each neck 28, 29 circumferentially at such part thereof where the wire band or tie 30 will cause the material forming the boot to be pressed into said groove. Obviously the flexibility of the boots will permit the spindle member to move with the rods as required, but will effectually exclude foreign matter from getting into the slideways for the rods in the sleeves. For convenience in lubricating the rods, suitable oil valves 31 may be provided in the boots adapted to be opened by and admit the nozzle of an oil can as is usual.

Having thus described the invention, what I claim is.

1. A shock absorber for vehicles comprising in combination a steering member with a body portion having a median bearing in its plane for the pivot bolt of an axle and having on opposite sides of said bearing pairs of upper and lower bearings in the same plane with the first-mentioned bearing, plunger rods adapted to slide in said upper and lower bearings, a spindle member having opposite bearings receiving said rods between the upper and lower bearings of the steering member, means preventing upward movement of the spindle member independent of said rods, and springs for cushioning the spindle member with respect to the steering member.

2. A shock absorber for vehicles comprising in combination a steering member with a body portion having a median bearing in its plane for the pivot bolt of an axle and having on opposite sides of said bearing pairs of upper and lower bearings in the same plane with the first-mentioned bearing, plunger rods adapted to slide in said upper and lower bearings, a spindle member engaging said plunger rods so that the same will move upward with it, and cushioning springs at the ends of said rods.

3. A shock absorber for vehicles comprising in combination a steering member with a body portion having a median bearing in its plane for the pivot bolt of an axle and having on opposite sides of said bearing pairs of upper and lower bearings in the same plane with the first-mentioned bearing, plunger rods adapted to slide in said upper and lower bearings, a spindle member engaging said plunger rods so that the same will move upward with it, and cushioning springs at the upper ends of said rods.

4. A shock absorber for vehicles comprising in combination a steering member with a body portion having a median bearing in its plane for the pivot bolt of an axle and having on opposite sides of said bearing pairs of upper and lower bearings in the same plane with the first-mentioned bearing, plunger rods in said upper and lower bearings, a spindle member engaging said plunger rods so that the same will move upward with it, cushioning springs at the ends of said rods, and caps for holding said springs.

5. A shock absorber for vehicles comprising in combination a steering member with a body portion having a median bearing in its plane for the pivot bolt of an axle and having on opposite sides of said bearing pairs of upper and lower bearings in the same plane with the first-mentioned bearing, the lower bearings being closed at their bottoms, plunger rods in said upper and lower bearings, a spindle member having opposite bearings receiving said rods between the upper and lower bearings of the steering member, and springs for cushioning the spindle member with respect to the steering member.

6. A shock absorber for vehicles comprising in combination a steering member with a body portion having a median bearing in its plane for the pivot bolt of an axle and having on opposite sides of said bearing pairs of upper and lower bearings in the same plane with the first-mentioned bearing, plunger rods in said upper and lower bearings having downwardly facing stops between the upper and lower bearings of the steering member, a spindle member having opposite bearings receiving said rods beneath said stops, and springs for cushioning said rods with respect to the steering member.

7. A shock absorber for vehicles comprising in combination a steering member with a body portion having a median bearing in its plane for the pivot bolt of an axle and having on opposite sides of said bearing pairs of upper and lower bearings in the same plane with the first mentioned bearing, plunger rods in said upper and lower bearings, a spindle member having opposite bearings receiving said rods between the upper and lower bearings of the steering member, said bearings on the spindle member and the upper and lower bearings of the steering member having their adjacent ends arranged and adapted to receive boots for excluding foreign matter, and springs for cushioning said rods.

8. A shock absorber for vehicles comprising in combination a steering member with a body portion having a median bearing in its plane for the pivot bolt of an axle and having on opposite sides of said bearing pairs of upper and lower bearings in the same plane with the first mentioned bearing inclined with respect thereto, plunger rods in said upper and lower bearings, a spindle member having opposite bearings receiving said rods between the upper and lower bearings of the steering member, and springs for cushioning the spindle member with respect to the steering member.

9. A shock absorber for vehicles comprising in combination a steering member with a body portion having a median bearing in its plane for the pivot bolt of an axle and having on opposite sides of said bearing pairs of upper and lower bearings in the same plane with the first-mentioned bearing inclined with respect thereto, plunger rods in said upper and lower bearings, a spindle member engaging said plunger rods so that the same will move upward with it, and cushioning springs at the ends of said rods.

10. A shock absorber for vehicles comprising in combination a steering member with a body portion having a median bearing in its plane for the pivot bolt of an axle and having on opposite sides of said bearing pairs of upper and lower bearings in the same plane with the first-mentioned bearing inclined with respect thereto, rods in said upper and lower bearings, a spindle member having opposite bearings receiving said rods between the upper and lower bearings of the steering member, and means for cushioning the spindle member with respect to the steering member.

11. A shock absorber for vehicles comprising a steering member apertured vertically to receive a pivot bolt and providing a pair of parallel bearings upon opposite sides of and at an angle to receive vertical aperture, rods slidably mounted in said bearings, resilient means for each rod tending normally to slide said rods in one direction, and a spindle member carried by said rods and adapted to transmit the recoil of a wheel mounted thereon to the springs in substantially the same line in which the blow passes from the periphery of the wheel to the spindle member.

12. A shock absorber for vehicles comprising a steering member apertured vertically to receive a pivot bolt and having a plurality of sleeves in a common plane said sleeves being alined in pairs at an angle to said aperture and the upper sleeve having an enlarged upper end, a cap for each of said enlarged ends adapted to be secured thereto, a rod for each alined pair of sleeves slidably mounted therein and extending into said cap, a spring in each of said caps operating upon the rod therein for normally sliding it in one direction, and a spindle member carried by said rods and adapted to transmit the recoil of a wheel mounted thereon to the springs in substantially the same line in which the blow passes from the periphery of the wheel to the spindle member.

In testimony whereof I have signed this specification in the presence of two subscribing witnesses.

FRANK M. CRANE.

Witnesses:
HOWARD P. KING,
JANET A. AYERS.

Copies of this patent may be obtained for five cents each, by addressing the "Commissioner of Patents, Washington, D. C."